United States Patent
Ouchi et al.

[11] Patent Number: 5,852,361
[45] Date of Patent: Dec. 22, 1998

[54] ROLLING BEARING UNIT HAVING A PLURALITY OF ROLLING MEMBERS BETWEEN A STATIONARY RACEWAY AND A ROTATABLE RACEWAY AND A ROTATING SPEED SENSOR

[75] Inventors: Hideo Ouchi, Fujisawa, Japan; Hiroya Miyazaki, Fujisawa, Japan

[73] Assignee: NSK Ltd., Tokyo, Japan

[21] Appl. No.: 676,959

[22] Filed: Jul. 8, 1996

[30] Foreign Application Priority Data

Jul. 7, 1995 [JP] Japan ................................ 7-172180
Jul. 10, 1995 [JP] Japan ................................ 7-173220

[51] Int. Cl.⁶ .................................................. G01P 3/46
[52] U.S. Cl. ........................................... 324/174; 384/448
[58] Field of Search ........................... 73/118.1; 324/173, 324/174, 207.22, 207.25; 384/446, 448, 544

[56] References Cited

U.S. PATENT DOCUMENTS

| | | |
|---|---|---|
| 3,772,549 | 11/1973 | Cumming . |
| 4,946,295 | 8/1990 | Hajzler . |
| 4,948,277 | 8/1990 | Alff . |
| 4,968,156 | 11/1990 | Hajzler . |
| 5,131,763 | 7/1992 | Caron . |
| 5,143,458 | 9/1992 | Alff et al. . |
| 5,209,701 | 5/1993 | Ishikawa et al. . |
| 5,263,366 | 11/1993 | Sakamoto . |
| 5,594,334 | 1/1997 | Sonnerat . |

FOREIGN PATENT DOCUMENTS

| | | |
|---|---|---|
| 0 488 853 | 6/1992 | European Pat. Off. . |
| 2 574 501 | 6/1986 | France . |
| 2 618 516 | 1/1989 | France . |
| 62-297530 | 12/1987 | Japan . |
| 3-48768 | 5/1991 | Japan . |
| 3-60069 | 6/1991 | Japan . |
| 3-83873 | 8/1991 | Japan . |
| 5-30543 | 4/1993 | Japan . |
| 2 233 767 | 1/1991 | United Kingdom . |
| 2 292 193 | 2/1996 | United Kingdom . |

*Primary Examiner*—Christine K. Oda
*Attorney, Agent, or Firm*—Evenson, McKeown, Edwards & Lenahan, P.L.L.C.

[57] ABSTRACT

A rolling-ball bearing unit with a rotating speed sensor comprising rotating and stationary rings, a tonewheel, a first seal ring provided to seal between the tonewheel and the section where rolling members are provided, and a second seal ring having a base end portion fixed to the peripheral portion of a cover for the sensor and a tip end portion provided in a sliding contact relationship with a member provided axially adjacent the bearing unit and rotating with the rotating ring, and a harness take-out portion provided in a relatively their portion of the cover.

3 Claims, 8 Drawing Sheets

ROLLING BEARING UNIT HAVING A PLURALITY OF ROLLING MEMBERS BETWEEN A STATIONARY RACEWAY AND A ROTATABLE RACEWAY AND A ROTATING SPEED SENSOR

FIELD OF THE INVENTION

The ball-bearing unit with rotating speed (rpm) detector of this invention can be used in the suspension of a vehicle to support a vehicle wheel so that it rotates freely, and to detect the rotating speed (rpm) of the wheel.

DESCRIPTION OF THE PRIOR ART

In order to control an anti-lock brake system (ABS) or traction-control system (TCS), it is necessary to detect the rotating speed (rpm) of the vehicle wheel. Therefore a ball-bearing unit with rpm detector that can be used in a vehicle suspension to rotatably support the wheel and to detect the rotating speed (rpm) of the wheel is necessary. This kind of ball-bearing unit with rpm detector has been known previously, for example, the construction of a device such as disclosed in Japanese Utility Model First Publication Kokai No. H3-60069.

Figure 4:
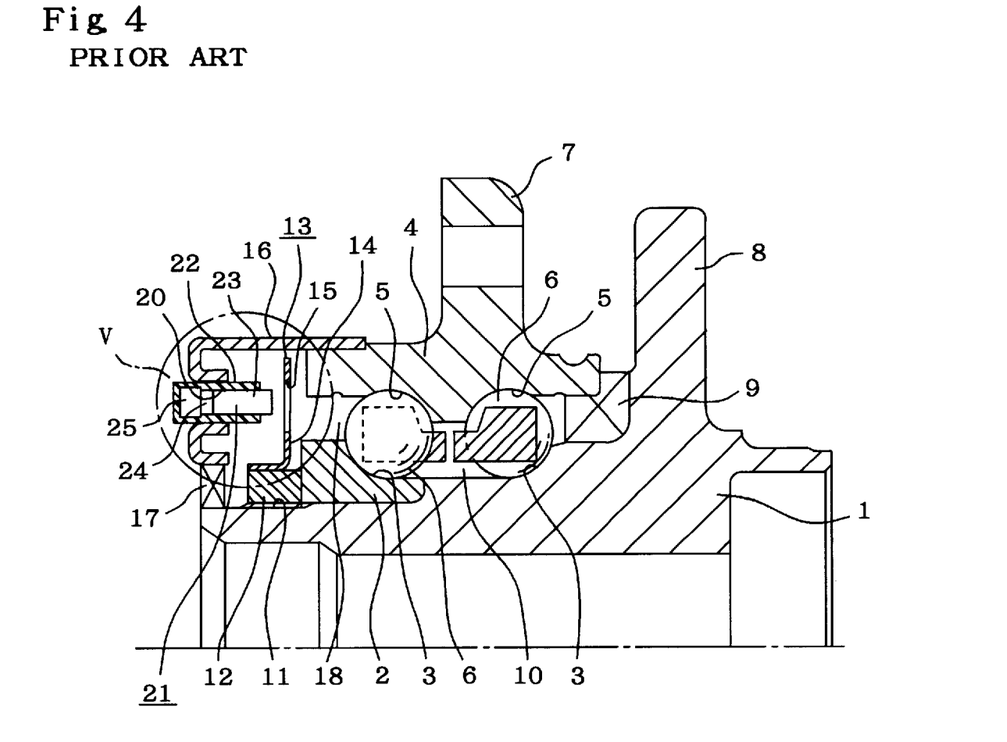
FIG. 4 is a cross-sectional view showing a half of one example of the prior art constructions.
Figure 5:
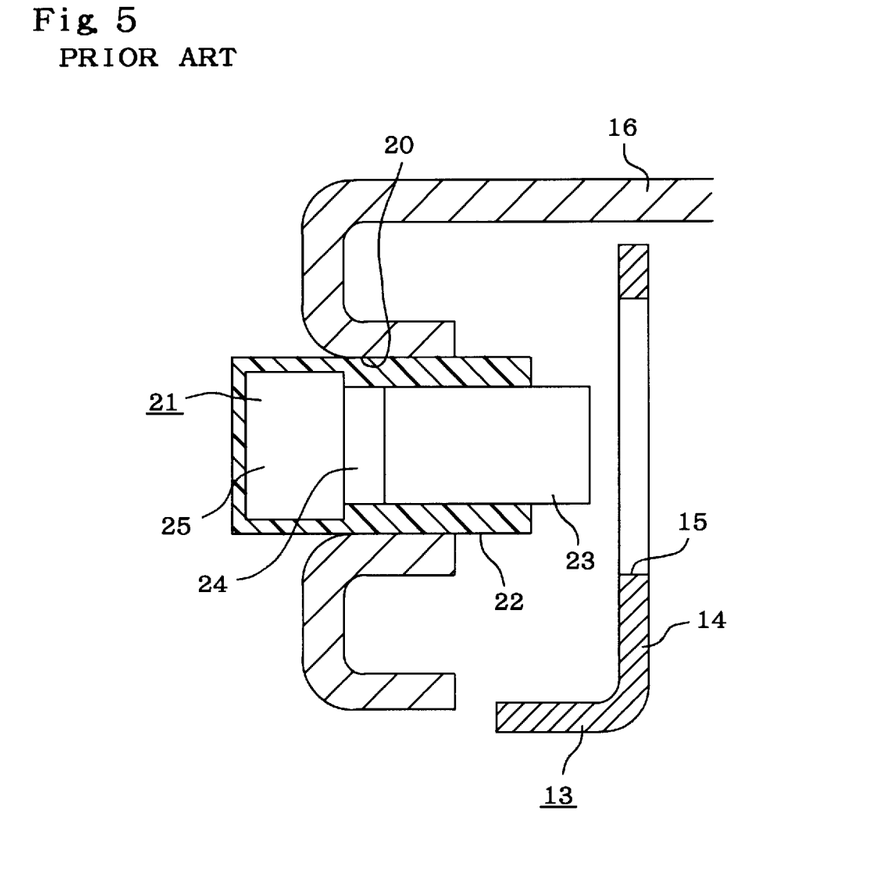
FIG. 5 is an enlarged view of part V of FIG. 4.

FIGS. 4 and 5 show the ball-bearing unit with rpm detector as disclosed in this publication. An inner ring member is comprised of a hub 1 and an inner ring 2 which is fixed onto this hub 1 so as to rotate when in use. Inner ring raceways 3 are formed around the outer peripheral surfaces of the hub 1 and inner ring 2. Outer ring raceways 5 are formed on the inner peripheral surface of an outer ring 4 which is located around the hub 1 and inner ring 2. The outer ring 4 does not rotate during use. Several rolling bodies such as balls 6 are located between each of the inner ring raceways 3 and outer ring raceways 5, so that they can roll freely, making it possible to rotatably support the hub 1 and inner ring 2 on the inside of the outer ring 4.

A first installation flange 7 is located in the middle of the outer peripheral surface of the outer ring 4 making it possible to attach the outer ring 4 to the suspension device. Also, a second installation flange 8 is located on the outer peripheral surface of one end of the hub 1 (right end in FIG. 4) separated from the outer ring 4, making it possible to attach the vehicle wheel to the hub 1. Moreover, a first sealing ring 9 is located between the opening portion on the axially outside end of the outer ring 4 and the peripheral surface of the hub 1 and inner side surface of the second installation flange 8.

The axially outside refers to the direction toward the outside when the device is installed in the automobile. This is the right side in FIG. 4 and the left side in FIG. 1.

This first sealing ring 9 covers the opening on the axially outside end of the cylindrical space 10 where the balls 6 are located, to prevents the grease in this cylindrical space 10 from leaking out, and also to prevent external objects from getting inside this cylindrical space 10.

A male threaded section 11 is formed on the outer peripheral surface of the hub 1 on the section that protrudes out and which is further on the axially inside than the inner ring 2.

The axially inside refers to the direction toward the inside of the automobile when the device is installed. This is the left side in FIG. 4 and the right side in FIG. 1.

A nut 12 is screwed on to this threaded section 11 to prevent the inner ring 2 from coming off, and a tonewheel 13 is located around the outer peripheral surface of this nut 12. This tonewheel is pressed from a magnetic sheet metal such as carbon steel, and it is formed in a circular ring shape and has an L-shaped cross section. Moreover, several through holes 15 are formed equal intervals around the circular section 14 of this tonewheel 13. The axially outside end of a sensor 21 (to be described later) faces the section on the axially inside surface of this circular section 14 where the through holes 15 are formed. The density of the magnetic flux, which occurs between the axially outside end of the sensor 21 and the circular section 14 of the tonewheel 13, changes as the tonewheel 13 rotates.

The outside opening of an annular shaped cover 16, which is pressed from sheet metal and has an L-shaped cross section, fits around the outer peripheral surface of the axially inside end of the outer ring 4. A second sealing ring 17 is located between the inside peripheral end of this cover 16 and the outer peripheral surface around the axially inside end of the hub 1, and it covers the axially inside opening of the space 18 where the balls 6 and tonewheel 13 are located.

A support hole 20 is formed in a portion of the cover 16 by burring etc., and a sensor 21 for detecting the rotating speed (rpm) is fitted inside the hole 20. This sensor 21 is provided in a casing 22 formed of non-magnetic synthetic resin and comprised of, in order starting from the side of the tonewheel 13, a stator 23 made of magnetic material, a detection element 24 which serves as a semiconductor magnetic sensor and whose resistance or output voltage changes as the magnetic flux changes, and a permanent magnet 25 magnetically oriented in the axial direction (left and right in FIGS. 4 and 5), with all of these elements being joined serially together. The casing 22 is open on the side of the tonewheel 13, and the end face of the stator 23 directly faces the tonewheel 13.

The aforementioned ball-bearing unit with rpm detector functions as described below. As the tonewheel 13, which is fixed to the hub 1, rotates as the wheel rotates, the density of the magnetic flux in the portion of the stator 23 of the sensor 21 changes. That is, when the end face of the stator 23 faces the column section between a pair of through holes 15 formed in the outer peripheral portion of the tonewheel 13, the magnetic flux from the axially outside end of the permanent magnet 25 passes through the column section and stator 23 and returns to the axially inside end of the permanent magnet 25. Therefore, the density of the magnetic flux in the section where the detection element 24 is located between the stator 23 and permanent magnet 25 increases and thus the resistance of the detection element 24 increases, or the output voltage of the detection element 24 increases. Conversely, when the end face of the stator 23 faces the through holes 15 formed in the outer peripheral portion of the tonewheel 13, the magnetic flux coming from the axially outside end of the permanent magnet 25 hardly returns to the axially inside end of the permanent magnet 25. Therefore, the density of the magnetic flux in the section where the detection element 24 is located decreases, and thus the resistance of the detection element 24 decreases, or the output voltage of the detection element 24 decreases.

The frequency at which the resistance or output voltage of the sensor 21 changes as the tonewheel 13 rotates is proportional to the rotating speed (rpm) of the wheel. If the output voltage of the sensor 21 is input into a controller (not shown in the figure), it is possible to control the ABS or TCS systems. The ratio that the aforementioned output voltage changes (ratio of the maximum and minimum output voltage) is always the same regardless of the rotating speed (rpm) of the tonewheel 13. Therefore it is possible to accurately detect the rotating speed (rpm) of the wheel regardless of the rotating speed (rpm) of the wheel.

The type of detection element 24 used determines whether the resistance or output voltage of the sensor 21 changes as the tonewheel 13 rotates. For example, if a Hall element is used as the detection element 24, the output voltage changes as the tonewheel 13 rotates, and so the change of output voltage is measured and the period or frequency of that change is used to determine the rotating speed (rpm) of the hub 1 to which the tonewheel 13 is attached. If a magnetic resistance type element is used as the detection element 24, the resistance changes as the tonewheel 13 rotates, and so the resistance is measured and the period of that change is used to determine the rotating speed (rpm) of the hub 1 to which the tonewheel 13 is attached.

In the prior construction shown in FIGS. 4 and 5, in order to obtain the output from the detection element 24, a harness (not shown in FIGS. 4 and 5) obtains the output in the axial direction from the rear of the detection element 24. To prevent interference between the harness and the constant-velocity joint 28 (see FIG. 1 of the embodiment of this invention) adjacent to the inner ring 2, it is necessary to keep an adequate amount of space between the constant-velocity joint 28 and the cover 16.

Especially in the case of a compact vehicle, not so in the case of a large vehicle, the space of this section is small, and it becomes difficult to prevent the interference between the harness and the constant-velocity joint 28.

Figure 10:
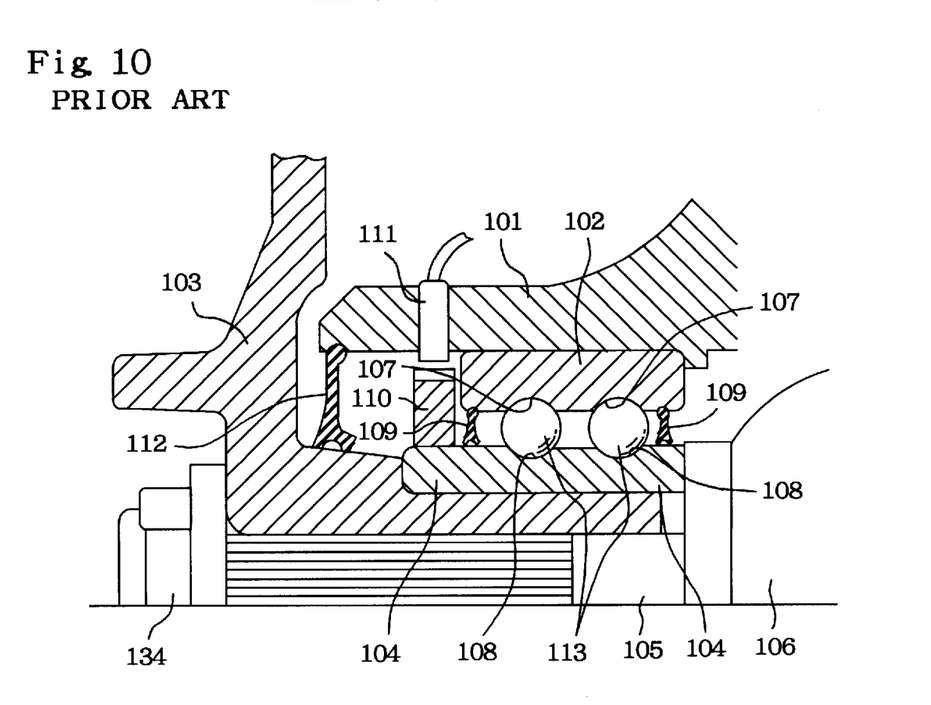
FIG. 10 is a cross-sectional view of a main portion of one example of the prior art construction.

On the other hand, the ball-bearing unit with rotating speed (rpm) detector disclosed in Japanese Patent First Publication KOKAI No. S62-297530 is shown in FIG. 10. A stationary outer ring 102 is fitted and fixed on the inside of a support cylinder 101 which is supported by the suspension. Also, rotating inner rings 104 are fixed around the outer peripheral surface of the hub 103. A spline-type drive shaft 105 is located on the inside of the hub 103, and as the vehicle is running, this drive shaft 105 is rotated by way of the constant-velocity joint 106. A first raceways, or outer ring raceways 107 are formed around a first peripheral surface or inner peripheral surface of the outer ring 102, and a second raceways, or inner ring raceways 108 are formed around a second peripheral surface or outer peripheral surfaces of the inner rings 104. Several rolling elements or balls 113 are located between the outer ring raceways 107 and the inner ring raceways 108, respectively, so that they are capable of rotating freely.

The radially outside base ends of sealing rings 109 are attached to the inner peripheral surface on both axial ends of the outer ring 102, and the radially inside tip ends of the sealing rings 109 come in contact with the outer peripheral surfaces of each of the inner rings 104. These sealing rings 109 prevent the grease in the section where the balls 113 are located, from leaking to the outside. A annular-shaped tonewheel 110 made of magnetic material fits around the end of one of the inner rings 104 (the left in FIG. 10) in the section which protrudes out from the end of the outer ring 102. By forming gear-like teeth around the outer peripheral surface of the tonewheel 110, the magnetic characteristics change in the circumferential direction around the outer peripheral surface, alternating at equal intervals. The tip end of a sensor 111, which sticks through and is supported by the support cylinder 101, faces the outer peripheral surface of the tonewheel 110 through a small gap.

Furthermore, the radially outside base end of a different sealing ring 112 is attached in the opening end portion of the outer ring 102, and the radially inside tip end of this sealing ring 112 comes in contact with the outer peripheral surface of the hub 103. This sealing ring 112 prevents water or foreign objects from getting into the area where the tonewheel 110 and sensor 111 are located.

In the ball-bearing unit with rpm detector as described above, the vehicle wheel attached to the hub 103 is supported so that it can rotate freely by the suspension by way of the support cylinder 101 inside which the outer ring 102 is fixed. Also, as the hub 103 rotates with the wheel, the output of the sensor 111, which faces the outer peripheral surface of the tonewheel 110 that is fixed to the hub 103 by way of the inner rings 104, changes. The frequency at which the output of the sensor 111 changes is proportional to the rpm of the wheel. If the output signal from this sensor 111 is input into a controller (not shown in the figure), it is possible to find the rotating speed (rpm) of the wheel and to adequately control the ABS or TCS system.

For the prior art construction described above, it is desired that the following two points be accomplished:

1. Reduce the number of the assembly work steps at the automobile manufacturer's factory and improve the efficiency of the assembly work at the factory.

In other words, in the case of the prior art construction shown in FIG. 10, an elemental unit, that includes everything but the support cylinder 101, drive shaft 105, constant-velocity joint 106 and sensor 111, is assembled by the bearing manufacturer and then delivered to the automobile manufacturer. The automobile manufacturer then combines this elemental unit with the separately delivered support cylinder 101, drive shaft 105, constant-velocity joint 106 and sensor 111, to obtain the ball-bearing unit with rpm detector as shown in FIG. 10. Therefore, the assembly work performed at the automobile manufacturer's factory is increased. Also, at the automobile manufacture's factory the process of pressure fitting the outer ring 102 of the ball bearing into the support cylinder 101 is performed first, so in the later processes it is necessary to handle the bearing together with the support cylinder 101. However, the support cylinder 101 has an arm for attaching it to the suspension and other members which increase the dimensions and weight. Therefore, there is also an extreme drop in efficiency which accompanies the increase in assembly work.

2. Prevent the tonewheel 110 from being damaged during shipment, and prevent its installed position from shifting.

In other words, in the case of the prior art construction shown in FIG. 10, the elemental unit described above is assembled at the bearing manufacturer's factory and then sent to the automobile manufacturer's factory, and there is a possibility that the exposed tonewheel 110 could bump into various things or be damaged, or that its installed position could shift before the elemental unit is assembled in its prescribed location. If the tonewheel 110 is damaged or if its installed position shifts, the elemental unit must be disposed of as a defective part, causing a great increase in the cost due to poor yield and is not desired.

SUMMARY OF THE INVENTION

An object of the present invention is to provide a ball bearing unit with rotating speed (rpm) sensor to remove the problems mentioned above.

Another object of the present invention is to provide a ball bearing unit with a rotating speed sensor having rotating and stationary rings, a tonewheel, a first seal ring provided to seal between the tonewheel and the section where the rolling members are provided, and a second seal ring having a base end portion which is fixed to the peripheral portion of a cover for the sensor and a tip end portion provided in a sliding contact relationship with a member rotating with the rotating ring.

Another object of the present invention is to provide a ball bearing unit with a rotating speed sensor having a harness takeout portion to take out a harness to output a signal from the sensor, and a cover for the sensor an axial length of which comprises a first larger portion with respect to holding the sensor and a shorter portion where the harness take-out portion is provided.

DESCRIPTION OF THE PREFERRED EMBODIMENTS

Figure 1:
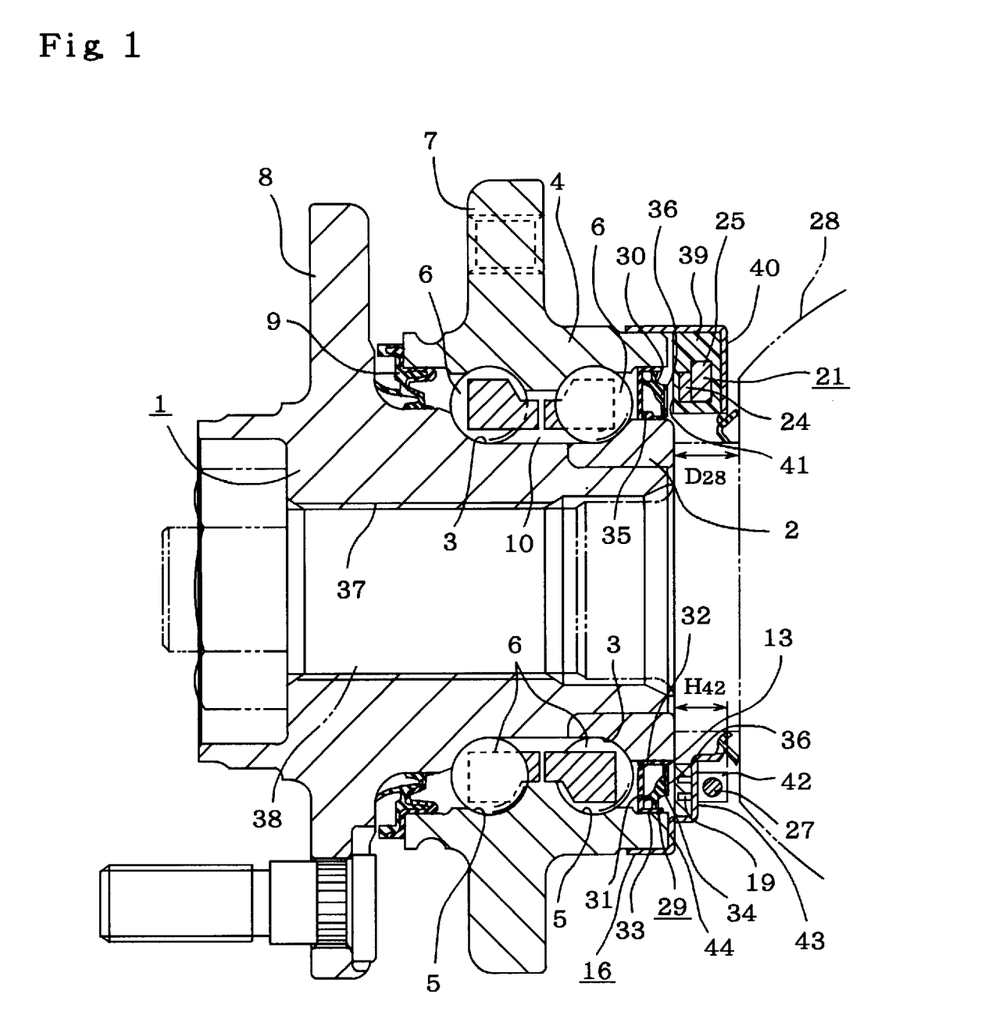
FIG. 1 is a cross-sectional drawing of an embodiment of this invention and is of the section I—I of FIG. 2.
Figure 2:
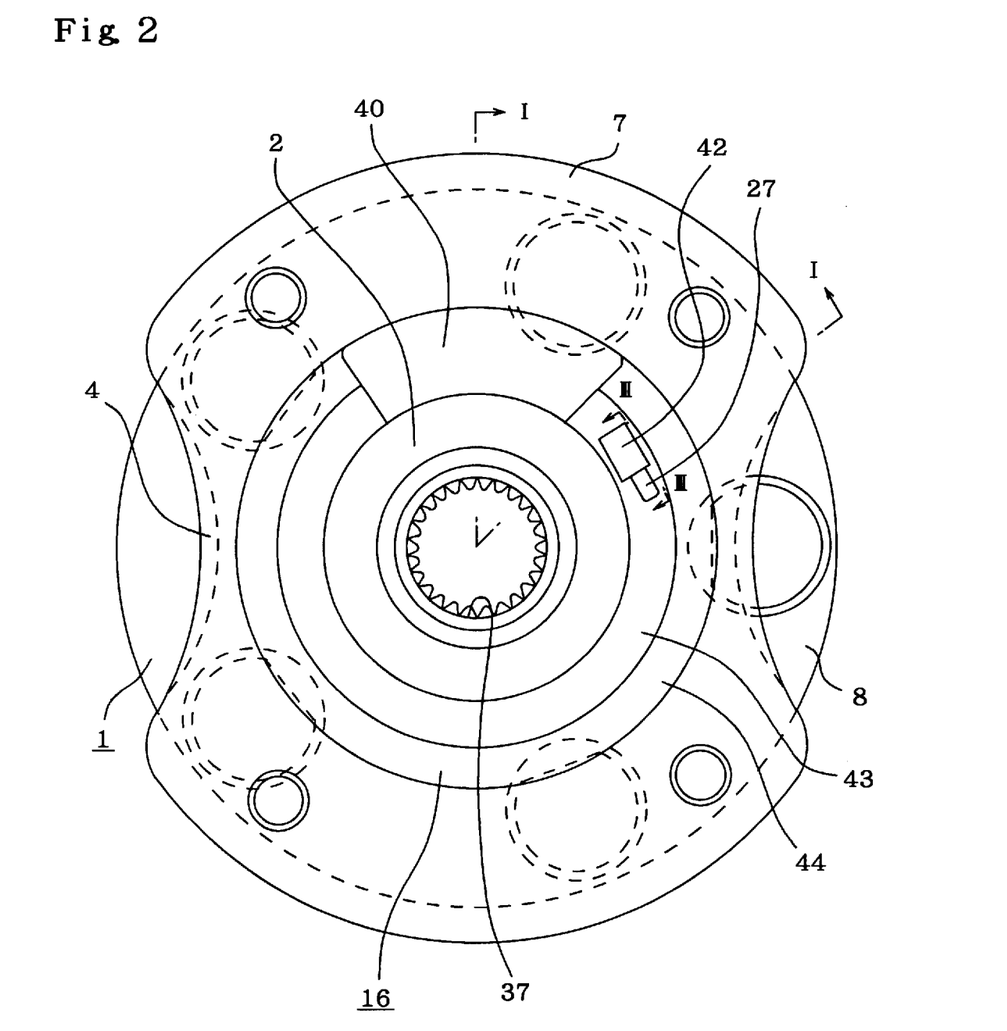
FIG. 2 is a right-side view of FIG. 1.
Figure 3:
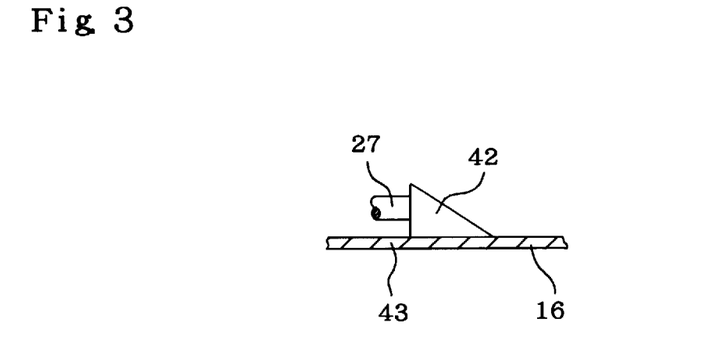
FIG. 3 is a cross-sectional view of the section III—III of FIG. 2.

FIGS. 1 thru 3 show an embodiment of this invention. As in the prior construction described above, an inner member comprises a hub 1 and an inner ring 2 which fits around the outside of the hub 1 so as to rotate during use. Also, inner ring raceways 3 are formed around the outer peripheral surface of the hub 1 and inner ring 2. Surrounding the hub 1 and inner ring 2 is an outer ring 4 which does not rotate during use and on whose inner peripheral surface outer ring raceways 5 are-formed. Several rolling bodies or balls 6 are located between each of the inner ring raceways 3 and outer ring raceways 5, so that they can roll freely, making it possible to rotatably support the hub 1 and inner ring 2 inside the outer ring 4.

A first installation flange 7 is formed on the outer peripheral surface in the middle of the outer ring 4 so as to attach the outer ring 4 to the suspension device. Also, a second installation flange 8 is formed on the outer peripheral surface on the axially outside end (left side in FIG. 1) of the hub 1 which is separated from the outer ring 4 so as to attach the wheel to the hub 1. Moreover, there is a first sealing ring 9 located between the opening portion on the axially outside end of the outer ring 4 and the outer peripheral surface of the hub 1 and axially inside surface of the second installation flange 8. This first sealing ring 9 covers the opening on the axially outside end of the cylindrical space 10 where the balls 6 are located.

Furthermore, the drive shaft 38 runs through the center hole 37 of the hub 1 and there is a spline connection between the outer peripheral surface of the drive shaft and the inner peripheral surface of the center hole 37. When the automobile is running, the drive shaft 38 is rotated by way of a constantvelocity joint 28. The remaining construction is basically the same as the prior construction described above.

Furthermore, a seal 29 is located between the outer peripheral surface on the axially inside end of the inner ring 2 which sticks out from the inner ring raceways 3 and the inner peripheral surface on the axially inside end of the outer ring 4, so as to cover the opening on the axially inside end of the cylindrical space 10. This seal 29 is comprised of a seal ring 30 on the rotating side that securely fits around the inner ring 2, and a seal ring 31 on the stationary side that securely fits into the outer ring 4. Moreover, both of these seal rings 30, 31 are comprised of core metals 32, 33 that are annular and have an L-shaped cross section, and elastic material 34, 35 which are reinforced by these core metals 32, 33. The edges of the elastic material 34, 35 of the seal rings 30, 31 come in contact with the core metal 33, 32 of the other seal ring 31, 30.

Of the seal rings 30, 31, the rotating seal ring 30 is located closer than the stationary seal ring 31 to the opening of the cylindrical space 10. The tonewheel 13 is attached to the axially inside surface (surface on the right side in FIG. 1) of the core metal 32 of this rotating seal ring 30, by adhesive or fusion bonding with the elastic material 34. This tonewheel 13 is circular and made of a magnetic material such as steel plate, and several equally spaced notches 36 are formed around the outer edge of the plate material so that the entire member is toothed and so that the magnetic characteristics alternate all the way around its circumference. It is not necessary to use a separate tonewheel 13, and it is possible to form a toothed section around the core metal 32 which can function as the tonewheel.

Furthermore, an entirely circular-shaped cover 16 having an L-shaped cross section fits around the portion on the axially inside end of the outer ring facing the tonewheel 13. A sensor 21 is supported on the inside of this cover 16. This sensor 21 is enclosed in synthetic resin 39 that is formed into a circular shape with a rectangular cross section, and fitted into a support section 40 that is formed in the cover 16. The sensor 21 faces a circumferential portion of the tonewheel 13 through a small gap 41.

The sensor 21 comprises a permanent magnet 25 that is magnetically oriented along the axial direction (right and left in FIG. 1), a Hall IC, and a detection element 24 such as a magnetic resistance element. The construction and function of this sensor 21 is substantially the same as the sensor 21 of FIGS. 4 and 5 built into the prior device described above except that the stator 23 (FIGS. 4 and 5) has been omitted, so that the dimension in the axial direction of the device must be reduced. The harness 27 from which the signal from the sensor 21 is obtained, runs to the outside of the cover 16 from the harness take-out section 42 located in the cover 16 separated in the circumferential direction from the support section 40. The harness 27 is connected to the detection element 24 by a terminal 19.

The length in the axial direction of the cover 16 is large in the support section 40 that supports the sensor 21, and short in the non-support section 43. In other words, the support section 40 is formed into a circular shape so that it matches the shape of the synthetic resin 39, and it sticks axially inward (right side in FIG. 1, front in FIG. 2) further than the non-support section 43. Also, the harness take-out section 42 is located in the non-support section 43 near the support section 40. The dimension H42 that the harness take-out section 42 sticks out is smaller than the interval D28 between the axially inside end of the inner ring 2 and the shoulder portion of the constant-velocity joint 28 (H42<D28). Moreover, there is no interference between the harness take-out section 42 and the constant-velocity joint 28. Furthermore, in the embodiment shown in the drawings, this harness take-out section 42 is triangular shaped and the harness 27 runs around the cover 16 in the circumferential direction. Also, the harness 27 runs through the harness take-out section 42 and does not come close to the constantvelocity joint 28, so there is no interference between the harness 27 and the constant-velocity joint 28.

In the ball-bearing unit with rpm detector of this invention described above, the harness take-out section 42 is located in the non-supporting section 43 whose length in the axial direction is small, therefore it is difficult for interference to occur between the harness 27 and the constant-velocity joint 28 that rotates the hub 1 and inner ring 2 of the inner-ring member. Particularly in the case of the embodiment shown in the drawings, if the harness 27 runs in the circumferential direction, it is possible to prevent interference between the harness 27 and constant-velocity joint 28 even more effectively.

In the case of the embodiment shown in the drawings, a stepped portion 44 is formed on the outer half of the non-supporting section 43, and one side of this stepped portion 44 touches the axially inside end of the outer ring 4. Moreover, this makes it possible to better position the cover 16 which faces the outer ring 4 and the sensor 21 which is supported by the cover 16.

The ball-bearing unit with rpm detector of this invention is constructed and functions as described above, and therefore regardless of the existence of the harness take-out section for the harness which is used to fetch the signal from the sensor, it makes it possible to reduce the size of the ball-bearing unit with rpm detector, and particularly makes it possible to reduce the length in the axial direction. Therefore, it can be installed in the very limited space for an rpm detector on the driven wheel of a compact automobile, thus greatly contribute to the wide spread use of ABS and TCS systems.

FIGS. 6 thru 9 show an embodiment of this invention. The stationary outer ring 114, which does not rotate during use, is supported by the suspension device (not shown in the figure) by an installation flange 115 formed around its outer peripheral surface. A first raceways, or outer ring raceways 107 are formed on a first peripheral surface, or the inner peripheral surface of the outer ring 114. On the other hand, the rotating race, which rotates during use, comprises a cylindrical hub 103 and an inner ring 104 which fits around the hub 103. A second raceways, or inner ring raceways 108, are formed on a second peripheral surface, or the outer peripheral surface of both the hub 103 and inner ring 104. Several rolling bodies, or balls 113, are located between the outer ring raceway 107 and inner-ring raceway 108 to make it possible for the hub 103 and inner ring 104 to rotate freely inside of the outer ring 114.

In the case of a roller-bearing unit for a heavy automobile, it is also possible to use tapered rollers as the rolling bodies.

Figure 6:
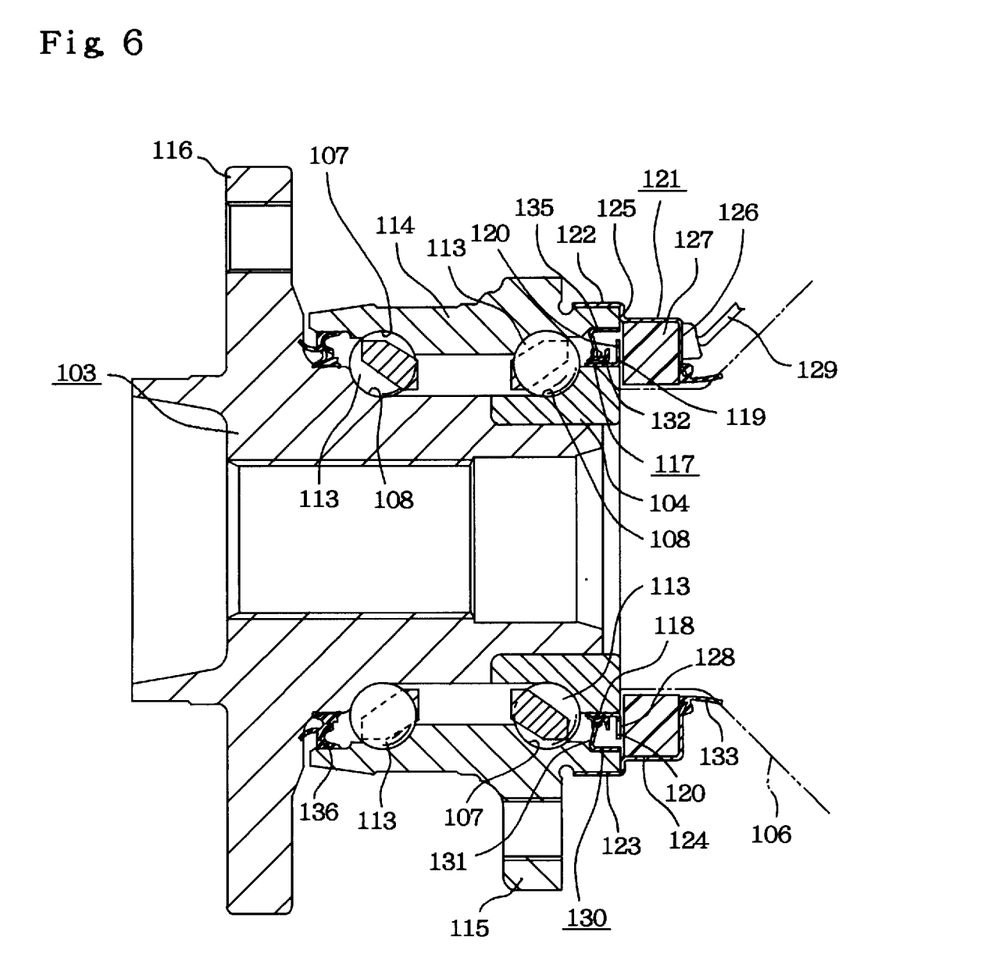
FIG. 6 is a cross-sectional view showing an embodiment of this invention.
Figure 7:
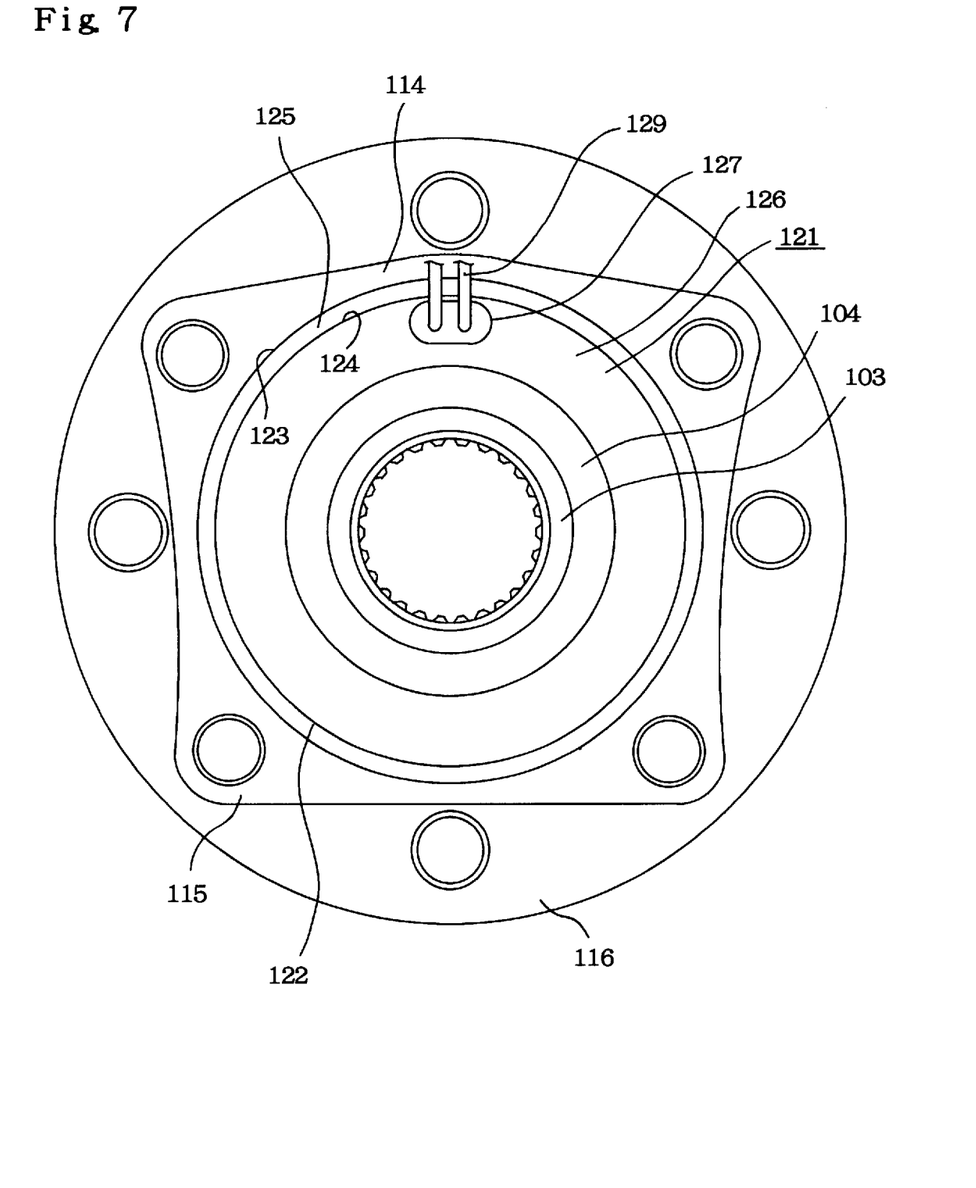
FIG. 7 is a right-side view of FIG. 6.
Figure 8:
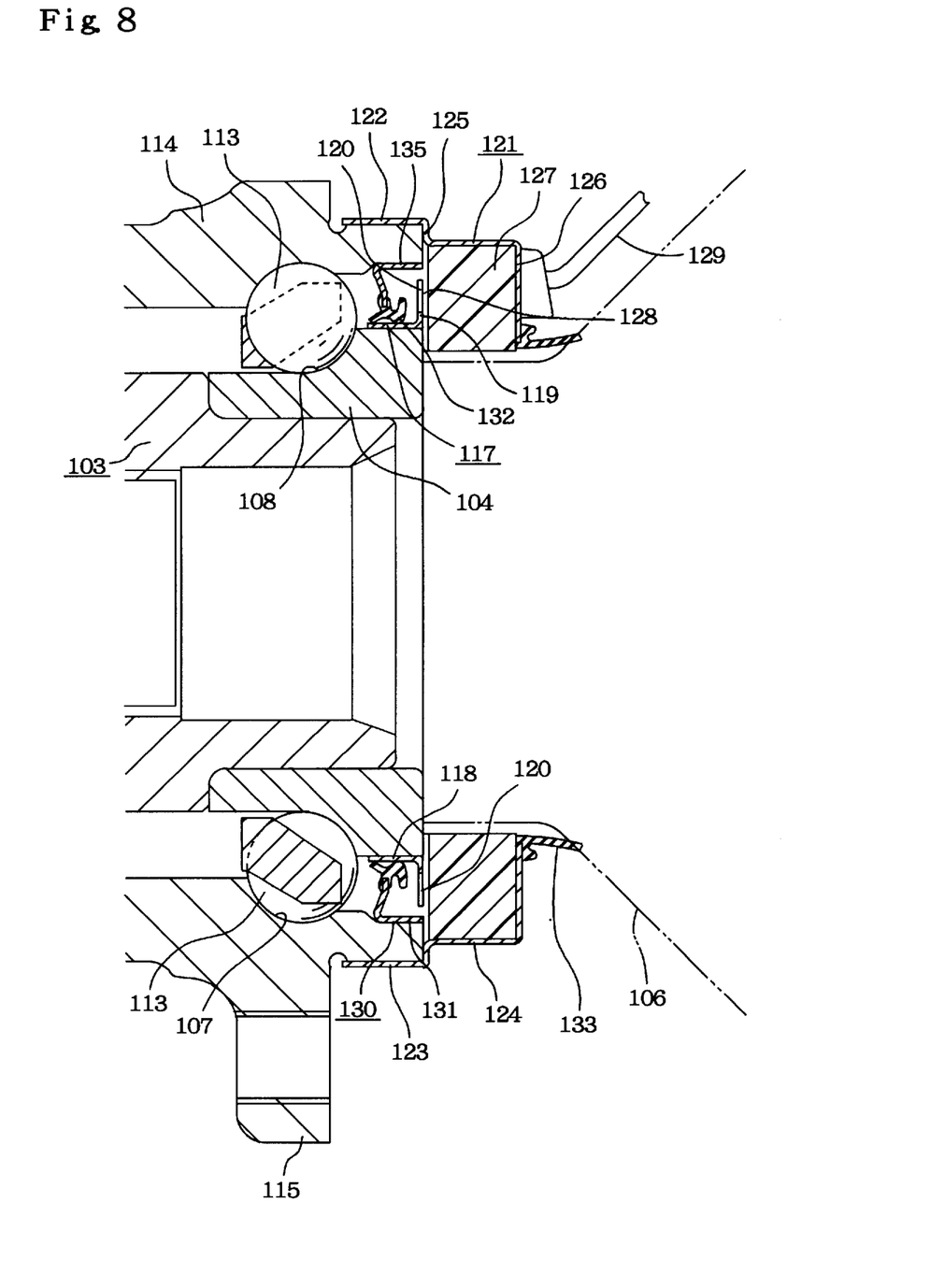
FIG. 8 is an enlarged view of the right portion of FIG. 6.
Figure 9:
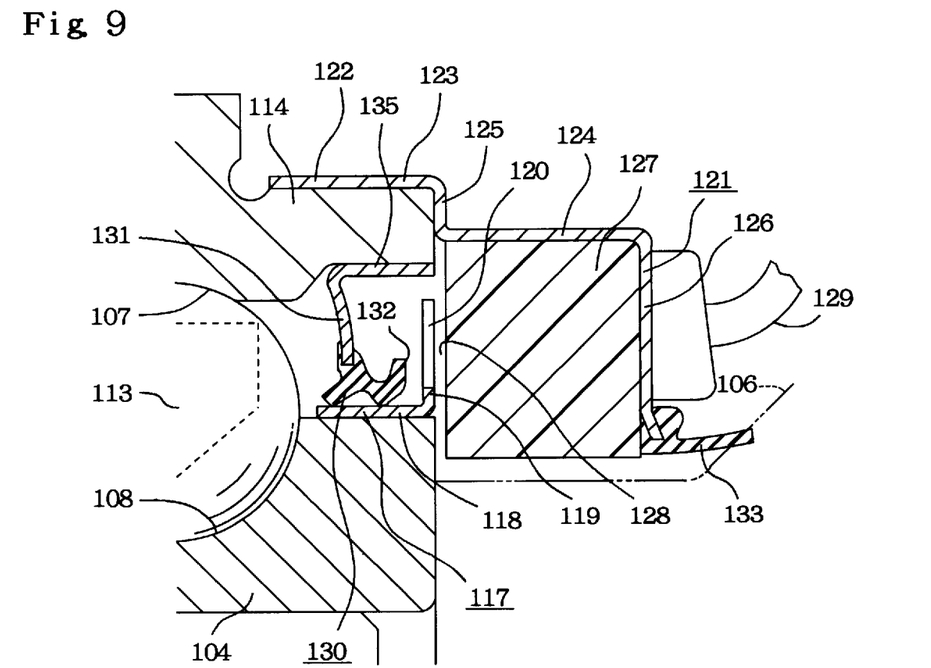
FIG. 9 is an enlarged view of the top portion of FIG. 8.

An installation flange 116 for supporting the wheel is formed on the outer surface of the hub 103 on the portion which protrudes out from the opening on the axially outside end of the outer ring 114 (the axially outside end is the end toward the outside of the vehicle when the unit is installed, or the left end in FIG. 6).

A tonewheel 117 is fitted onto the axially inside end (the axially inside end is the end toward the inside of the vehicle when the unit is installed, or the right end in FIG. 6) of the inner ring 104 on the portion that protrudes out from the inner-ring raceway 108. This tonewheel 117 is formed by a pressing magnetic sheet metal such as steel plate into an entirely annular shape having an L-shaped cross section. In other words, this tonewheel 117 has a cylindrical section 118 and a circular ring section 119 which bends perpendicularly outward in the radial direction from the axially inside edge of the cylindrical section 118. Several equally spaced notches 120 are formed around the circumference of the circular ring section 119. This circular ring section 119 is toothed and its magnetic characteristics alternate at equal intervals around its circumference.

In order to change the magnetic characteristics in the circumferential direction of one side on the circular ring section 119, besides using notches as shown in the drawings, it is also possible to use other conventional construction. For example, several equally spaced through holes can be formed around the circumference of the circular ring section 119, or it is also possible to form the circular ring section 119 out of ferromagnetic material where the South and North poles are alternately arranged around the circular ring section 119, or it is even possible to apply permanent magnets to the circular ring section 119 so that the South and North poles of the permanent magnets are alternately arranged around the circular ring section 119.

A cover 121 fits around the opening on the axially inside end of the outer ring 114. This cover 121 is deeply drawn from sheet metal such as stainless steel and formed into an entirely annular shape having an L-shaped cross section. This cover 121 has a bottom section 126 and surrounding wall section 122, and the wall section 122 is comprised of a large-diameter section 123 at the opening end side and a small-diameter section 124 at the far end side and both sections are formed so that they are continuous through a stepped section 125. In order to attach this cover 121 with surrounding wall section 122 to the outer ring 114, the large-diameter section 123 fits tightly around the axially inside end of the outer ring 114 and the stepped section 125 comes against the edge of the axially inside end of the outer ring 114. In this way the cover 121 is securely attached to the outer ring 114 in a specified positional relationship.

A sensor (not shown in the drawing) in an entirely annular shaped is embedded in synthetic resin 127 also in an annular shape that is fitted inside the portion of the cover 121 surrounded by the small-diameter section 124 and bottom section 126. The sensor faces all the way around the axially inside surface of the circular ring section 119 of the tonewheel 117 through a small gap 128 in the axial direction (left and right in FIGS. 6, 8 and 9). With this kind of sensor, the sensor output changes as the magnetic resistance between it and the tonewheel 117 changes as the hub 103 and inner ring 104 rotate. This output is fetched using a harness 129, and then sent to the controller (not shown in the drawing) of the ABS or TCS system. This kind of annular sensor has been known in the prior art such as disclosed in Japan Hatsumei Kyokai Technical Report No. 94-16051, and is not a concept of this invention and therefore its detailed description is omitted from the drawings and explanation. For this invention it is not necessary that the sensor be annular shaped.

A first seal ring 130 is located between the circular ring section 119 and the section where the balls 113 are provided. This first seal ring 130 is comprised of a metal core 131 and an elastic material 132 that is formed around the inner peripheral edge of the metal core 131. The metal core 131 is entirely annular having an L-shaped cross section and by fitting the cylindrical section 135 into the axially inside end of the outer ring 114, so that the metal core 131 is supported between the circular ring section 119 and section where the balls 113 are located. In this way, the edge of the elastic material 132 made of rubber, elastomer or the like and formed into an annular shape comes into contact with the outer peripheral surface of the cylindrical section 118 of the tonewheel 117. Accordingly, it prevents grease in the section where the balls 113 are located, from getting onto the tonewheel 117 or the sensor section.

Furthermore, the base of a second seal ring 133 is fastened to the inside peripheral edge of the bottom section 126 of the cover 121. This second seal ring 133 is different from the first seal ring 130 described above, in that since the cover 121 is used as the metal core, it does not have a metal core but is entirely made of elastic material such as rubber, elastomer etc. The edge of this second seal ring 133 comes in contact with the outer peripheral surface of the constant-velocity joint 106 which rotates together with the hub 103 and inner ring 104. Moreover, a third seal ring 136 is fitted inside the inner peripheral surface on the axially outside end of the outer ring 114, and the edge of the seal lip of this third seal ring 136 comes in contact with the axially inside surface of the installation flange 116 and the outer peripheral surface of the hub 103. The second and third seal rings 133, 136 prevent water or foreign objects from getting into the section where the balls 113 are located and in the sensor section.

In the ball-bearing unit with rpm sensor of this invention constructed as described above, the installation flange 115 on the outer peripheral surface of the outer ring 114 is attached to the suspension, and by attaching the wheel to the installation flange 116 on the outer peripheral surface of the hub 103, the wheel is supported so that it can rotate freely with respect to the suspension. With this construction, the rotating speed (rpm) of the wheel can be found from the output of the sensor which changes as the tonewheel 117 rotates.

Especially in the case of the ball-bearing unit with rpm sensor of this invention, the ball bearing unit section comprised of the outer ring 114, hub 103, inner ring 104 and balls 113, and the sensor, tonewheel 117 and first and second seal rings 130, 131 can be assembled at the factory of the ball-bearing manufacturer as a single unit, and then delivered to the factory of the automobile manufacturer. Also, after the assembled ball-bearing unit with rpm sensor has been delivered to the factory of the automobile manufacturer, the installation flange 115 is attached to a member of the vehicle suspension on the body side, and the outer peripheral surface of the drive shaft, which is connected to the constant-velocity joint 16, is connected to the inner peripheral surface of the hub 103 using a spline joint, and finally installation of the ball-bearing unit with rotating speed (rpm) sensor is completed by screwing a nut 34 onto the end of the drive shaft 105.

This invention makes it possible to reduce the number of the assembly work steps at the factory of the automobile manufacturer, and increase the efficiency of the assembly work. Moreover, the ball-bearing unit with rpm sensor can be assembled at the factory of the bearing manufacturer as a single ball-bearing unit. The dimensions and weight of the single ball-bearing unit are not so large so the direction of assembly is very favorable. At the factory of the automobile manufacturer, the ball-bearing unit must be handled together with the support cylinder 101 (FIG. 10), so the assembly direction is restricted by its dimensions and weight. Moreover, the drop in assembly efficiency that accompanies the increase in assembly work at the factory of the bearing manufacturer is much less than the drop in efficiency when the ball-bearing unit was assembled with the suspension at the factory of the automobile manufacturer as was in the case of the prior art construction. Overall, it is possible to obtain large improvements in efficiency.

Also, the tonewheel 117 is covered by a cover 121 so it is not exposed, so there is little possibility for the tonewheel 117 being bumped by other parts during shipping and handling. Therefore, after being assembled at the factory of the bearing manufacturer, it is possible to reduce the amount of defective parts due to the tonewheel 117 being damaged or shifting of its installation position, and thus improve yield.

The ball-bearing unit with rpm detector of this invention is constructed and functions as described above, and therefore the following is possible:

1. Reduce the number of the assembly work steps at the automobile manufacturer's factory and improve the efficiency of the assembly work at the factory.
2. Prevent the tonewheel 117 from being damaged during shipment, and prevent its installed position from shifting, making it possible to prevent the occurrence of defective parts, and thus improve yield and reduce costs.

What is claimed is:

1. A rolling bearing unit with a rotating speed sensor comprising:

a stationary ring having a first peripheral surface on which a first raceway is formed, a rotatable ring having a second peripheral surface on which a second raceway is formed, a member rotating with the rotatable ring, a plurality of rolling members provided in a section between the first and second raceways, a tonewheel fixed to the rotatable ring, a cover fixed to the stationary ring and a peripheral portion, a sensor supported by the cover, the tonewheel having a circular ring portion, and a side face of which is faced to the sensor with an axial small gap therebetween and having magnetic characteristics alternately changed with a uniform interval in a circumferential direction, a first seal ring provided between the circular ring portion and the section where the rolling members are provided, to seal between the tonewheel and the section, and a second seal ring having a base end portion which is fixed to the peripheral portion of the cover and a tip end portion provided in a sliding contact relationship with the member rotating with the rotatable ring.

2. A rolling bearing unit with a rotating speed sensor comprising:

a stationary outer ring member having an inner peripheral surface on which an outer ring raceway is formed, a first mounting flange provided on an outer peripheral surface of the outer ring member to mount the outer ring member to a suspension apparatus, an inner ring member having an outer peripheral surface on which an inner ring raceway is formed, and a central bore through which a drive shaft extends to rotate the inner ring member during use, a second mounting flange mounted to the outer peripheral surface of the inner ring member at a portion spaced from the outer ring member at a first end of the inner ring member to mount a vehicle wheel to the inner ring member, a plurality of rolling members provided between the outer and inner ring raceways, an annular tonewheel fixed to the outer peripheral surface of the inner ring member at a portion spaced from the inner ring raceway at a second end of the inner ring member, and having magnetic characteristics alternately changing with a uniform interval in a circumferential direction, an annular cover fixed to the outer ring member at a portion faced to the tonewheel, a sensor supported inside the cover and faced to the tonewheel at a circumferential portion thereof, a harness take-out portion to take out a harness to output a signal from the sensor, and the cover having an axial length comprising a first larger portion with respect to holding the sensor and a shorter portion where the harness take-out portion is provided.

3. A rolling bearing unit with a rotating speed sensor of claim 1, further having a harness take-out portion to take out a harness to output a signal from the sensor, and the cover having an axial length comprising a first larger portion with respect to holding the sensor and a shorter portion where the harness take-out portion is provided.

* * * * *